(12) United States Patent
Ingels

(10) Patent No.: US 9,221,682 B2
(45) Date of Patent: Dec. 29, 2015

(54) ENERGY EFFICIENT PROCESS FOR PRODUCING NITROGEN OXIDE

(75) Inventor: Rune Ingels, Svene (NO)

(73) Assignee: N2 APPLIED AS, Oslo (NO)

( * ) Notice: Subject to any disclaimer, the term of this patent is extended or adjusted under 35 U.S.C. 154(b) by 0 days.

(21) Appl. No.: 14/113,703

(22) PCT Filed: Apr. 23, 2012

(86) PCT No.: PCT/NO2012/050073
§ 371 (c)(1),
(2), (4) Date: Jan. 6, 2014

(87) PCT Pub. No.: WO2012/150865
PCT Pub. Date: Nov. 8, 2012

(65) Prior Publication Data
US 2014/0127118 A1   May 8, 2014

(30) Foreign Application Priority Data

May 4, 2011   (NO) .................................. 20110659

(51) Int. Cl.
*C01B 21/20* (2006.01)
*C01B 21/30* (2006.01)
*B01J 19/08* (2006.01)

(52) U.S. Cl.
CPC ............. *C01B 21/203* (2013.01); *B01J 19/088* (2013.01); *C01B 21/30* (2013.01); *B01J 2219/083* (2013.01); *B01J 2219/085* (2013.01); *B01J 2219/0809* (2013.01);
(Continued)

(58) Field of Classification Search
CPC ...... C01B 21/203; C01B 21/24; C01B 21/26; C01B 21/28; C01B 21/30; C01B 21/32

USPC .................................................... 423/400–405
See application file for complete search history.

(56) References Cited

U.S. PATENT DOCUMENTS

| 1,586,823 | A | 6/1926 | Matthews |
| 1,902,384 | A | 3/1933 | Steinbuch et al. |

(Continued)

FOREIGN PATENT DOCUMENTS

| CN | 1099997 | 3/1995 |
| GB | 866 | 0/1913 |

(Continued)

OTHER PUBLICATIONS

International Search Report issued Jul. 27, 2012 in corresponding International Application No. PCT/NO2012/050073.
Norwegian Search Report issued Dec. 5, 2011 in corresponding Norwegian Application No. 20110659.

*Primary Examiner* — Anthony J Zimmer
*Assistant Examiner* — Justin Bova
(74) *Attorney, Agent, or Firm* — Wenderoth, Lind & Ponack, L.L.P.

(57) ABSTRACT

A process for producing NO gas from a feed flow of air or oxygen enriched air, by means of moving an electric arc through the air flow by using a magnetic field and AC or DC currents, in a reactor, wherein a pressure lower than 1 bar is applied, wherein the temperature in the exited arc is adjusted to be within the range of 3000 to 5000 Kelvin, and wherein the air flow is quenched by applying a spray of fine water droplets upstream or just downstream the arc, excess air feed or bypassed air to obtain a stable NO-containing plasma having a temperature below 2000 Kelvin.

10 Claims, 3 Drawing Sheets

(52) U.S. Cl.
CPC .. *B01J 2219/0828* (2013.01); *B01J 2219/0858* (2013.01); *B01J 2219/0869* (2013.01); *B01J 2219/0871* (2013.01); *B01J 2219/0875* (2013.01)

(56) References Cited

U.S. PATENT DOCUMENTS

| | | | |
|---|---|---|---|
| 2,485,476 A | 10/1949 | Cotton | |
| 3,439,196 A | 4/1969 | Hals | |
| 3,471,723 A | 10/1969 | Maslan | |
| 3,546,499 A * | 12/1970 | Somers | 310/11 |
| 3,553,527 A * | 1/1971 | Gutsche et al. | 219/137 WM |
| 3,666,408 A | 5/1972 | Grosse et al. | |
| 4,267,027 A | 5/1981 | Amouroux et al. | |
| 4,705,670 A | 11/1987 | O'Hare | |
| 4,833,293 A | 5/1989 | O'Hare | |
| 4,877,589 A | 10/1989 | O'Hare | |
| 2005/0218007 A1 * | 10/2005 | Pekshev et al. | 205/615 |

FOREIGN PATENT DOCUMENTS

| | | |
|---|---|---|
| GB | 105135 | 4/1917 |
| GB | 159709 | 3/1921 |
| GB | 700801 | 12/1953 |
| GB | 915771 | 1/1963 |
| NO | 12961 | 2/1903 |
| NO | 20487 | 7/1908 |
| NO | 19862 | 7/1909 |
| SE | 26011 | 8/1907 |

* cited by examiner

Figure 3
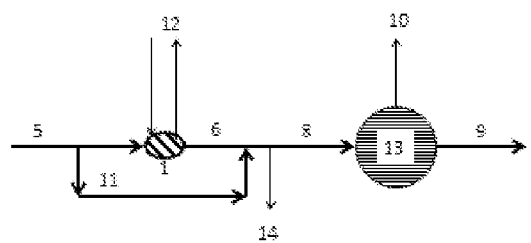
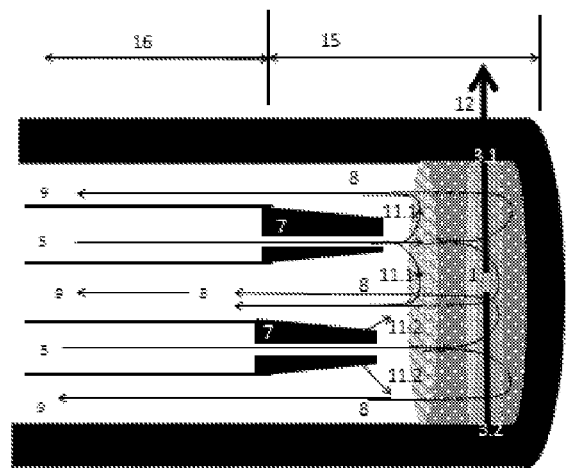
Figure 4

Figure 5
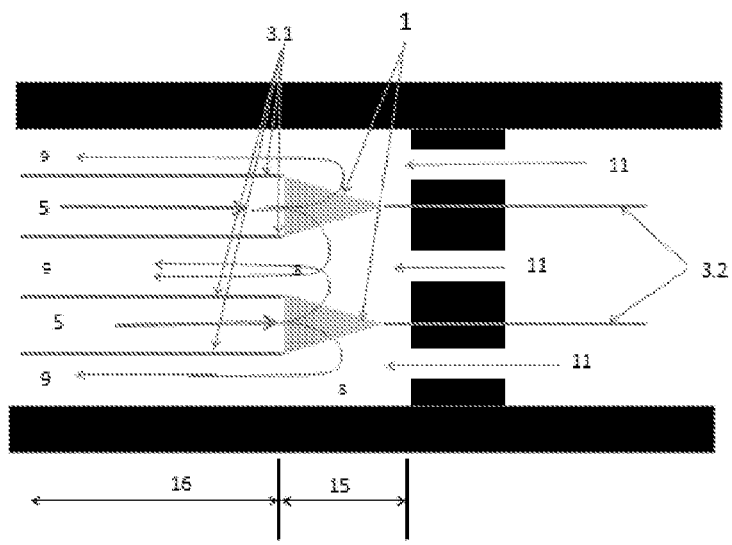
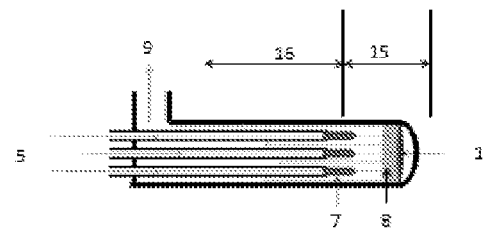
Figure 6

ENERGY EFFICIENT PROCESS FOR PRODUCING NITROGEN OXIDE

TECHNICAL FIELD

The present invention relates to a process for producing NO gas from a feed flow of air or oxygen enriched air, by means of moving an electric arc through the air flow by using a magnetic field and AC or DC currents, in a reactor. The process can be carried out by using a reactor comprising an arc and plasma disc section and a heat exchanger section.

BACKGROUND OF THE INVENTION

Industrial nitrogen fixation was at the beginning of the 20$^{th}$ century, described as six different technology principles by J. W. Mellor, Inorganic and theoretical chemistry, "The fixation of atmospheric nitrogen" p. 366: (1) Fixation of nitrogen with oxygen in an electric arc plasma reactor. Birkeland-Eyde (B-E) and Schönherr; (2) The Calcium Cyanamid process. Reaction via calcium carbide. Frank-Caro; (3) The Barium Cyanide process. One step reaction with carbon and nitrogen; (4) Fixation of nitrogen with hydrogen on an iron catalyst. Haber-Bosch; (5) Absorption of nitrogen in metal with a reaction to ammonia when exposed to water; and (6) Nitrogen fixation in general combustion processes.

In the industrial development, the four first processes were dominating, and for a period they were competing. In the first process, the electric arc process reacted nitrogen with oxygen according to the reaction:

$$N_2+O_2=2NO \ \Delta H_f=6.4 \ GJ/tN \qquad \text{I}$$

The development of the ammonia process involved reacting nitrogen with hydrogen from water and air:

$$3H_2O(l)=3H_2(g)+1.5O_2(g) \ \Delta H_f=30.61 \ GJ/tN \qquad \text{II}$$

$$+N_2(g)+3H_2(g)=2NH_3(l) \ \Delta H_f=-5.77 \ GJ/tN \qquad \text{III}$$

$$=3H_2O(l)+N_2(g)=1.5O_2(g)+2NH_3(l) \ \Delta H_f=24.84 \ GJ/tN \qquad \text{IV}$$

The most competitive way to produce ammonia today is through steam reforming of methane, where the stoechiometric minimum is 18 GJ/tNH$_3$ and best industry practice is 27-30 GJ/tNH$_3$ corresponding to 33-35 GJ/tN. In this process the advantage is that the Hydrogen also comes from the energy source.

The first large scale production initiative applying electric arcs was carried out by "Atmospheric Air Products Company" in Niagara Falls. The process failed due to lower than expected yield and high power costs, and was closed after a short trial period.

The first direct nitrogen fixation that was able to deliver a potent contribution to the global fertilizer market was the Birkeland-Eyde process. "Norsk Hydroelektrisk Kvelstoff Aksjeselskap" was established in order to industrialize this process.

The B-E process was completely different from the other processes by the way it controlled the intensity of the electric arc by means of a magnetic field. The electric arc was shaped into a two dimensional disk. The air was fed into the plasma disk perpendicular through ceramic perforated plates on both sides of the disk. The air was leaving radially into the outer circular collection tube. The B-E process was easier to scale up, start up, operate and control compared to other processes.

The Schönherr process developed by BASF, was an electric arc in a tube reactor with heat recovery from a counter current heat exchange between feed and product gases. The tube reactor gave a better potential for operating under higher pressure. The Schönherr reactors were also installed at Notodden.

In the electric arc processes, the temperature in the arc was calculated to be in the range between 3000 and 4000 K. The yield was normally described by the percentage of NO achieved in the air outlet, and was from 1% to 2%.

The global research with several types of small-scale reactors had given higher yields, but most attempts to increase scale and capacity failed to meet the expectations.

The energy consumption for the B-E process was described as kgHNO$_3$/kilowatt year. The energy consumption at 3200 K was 285 kgHNO$_3$/kilowatt year, and this corresponds to 474 GJ/tN. This includes all industrial losses. The reactors were performing much better over short periods with close follow-up. The load per reactor also had a significant effect on the energy consumption. The high energy consumption was explained by the frames given for the reaction:

The high reaction temperature, 3000-4000 K was required for the dissociation of nitrogen.

The maximum yield was 2% NO in the air, which meant most of the energy was used for heating the air.

Heat recovery was not applied because of the extreme temperatures and the low value of the waste energy.

The improvement potential was substantial and documented in the scientific environment. The consensus for how to significantly improve the process was:

Operating the process at higher pressure was known to give a higher yield of NO. The challenge was however to find the materials able to withstand the pressure and temperature.

Applying a catalyst for lowering the required temperature for cracking the N2 molecule.

The following three Norwegian patents are supporting the initial industrial realization and development and are defining the basic features of the electric arc process.

Norwegian Patent 12961 of Feb. 20, 1903 is the original Birkeland method where the electric arc is shaped as a disc by the means of using a magnetic field and alternating the current. No performance data is given in the patent, but the industrial process gave 1-2% NO with a gross energy consumption of 300-500 GJ/tN.

Norwegian Patent 20487 of Jul. 22, 1908 by BASF, is describing that by direct contact cooling of the plasma, a yield of 9.5% to 14% is achievable. The contact cooling was achieved by lowering the pressure to expand the volume and external surface of the plasma. Energy consumption reported was 90 gHNO$_3$/kWh=8.8 GJ/tN. The patent is referring to Journal of chemical Soc. 1897, vol 71, page 181 and is stating that the lowering of the pressure alone has no independent effect on the yield. The patent further claims that higher pressure is better for the conversion to NO, but the low pressure is required for the direct contact cooling, and to reduce the decomposition of NO.

Norwegian Patent 19862 of Jul. 9, 1909, by BASF, claims that by using an air cooled tube-shaped anode, it is possible to produce cold plasma. The patent claims that normal to slightly lower pressure is required to lower the temperature of the anode and produced plasma.

The next generation of patents is focusing on improving the individual and initial features with a variety of practical solutions.

Swiss Patent 105135 of Apr. 5, 1917 describes the use of several arcs arranged to give a continuous plasma arc which is further chilled by external gases alone or with gas containing solids. No performance data given.

British Patent 159709 of Mar. 10, 1921 describes a method of using magnetic fields to shape a nozzle-like electric arc. No performance data given.

U.S. Pat. No. 1,902,384 of Mar. 21, 1933 describes a method for shaping the plasma arc by means of a magnetic field without alternating the current. No performance data given.

U.S. Pat. No. 2,485,476 of October 1949 describes a method of combining high potential and low potential electrodes operating cyclically. The claimed effect being that through wavelength adjustment the yield can be optimized. One claim is also covering operation at a half atmosphere. Reported results range from 30 to 120 $gHNO_3$, which corresponds to 135 to 540 GJ/tN.

British Patent 700,801 of Dec. 9, 1953 describes a method for achieving two plasma phases, one producing negative ions and the other producing positive ions, by high frequency alternation of the electric field. Mixing and extracting the mix from the plasma zone is further reducing the decomposition of the formed oxides. The performance data, gross outcome 14.5-115 $gHNO_3$/kwh and net outcome 100-300 $gHNO_3$/kwh.

British Patent 915,771 of Jan. 16, 1963 describes a method operating at excess of 400 mmHg, applying an alternating electric field of radio frequency, producing cold plasma. The process is applied for different processes. No results from the 400 mmHg operation for NO. From operating at 1 atm, 0.3% to 5% NO is reported with an energy consumption of 16-68 $gHNO_3$/kwh.

U.S. Pat. No. 3,439,196 of Apr. 15, 1969 and U.S. Pat. No. 3,471,723 of Oct. 7, 1969 describe a conceptual full industrial process for producing nitric acid based on an improved process for supplying energy and recovering this in a magneto-hydrodynamic generator. The process is operating at above atmospheric pressure. There are no documented results in the patents.

U.S. Pat. No. 3,666,408 of May 30, 1972 describes a process where the oxygen and nitrogen plasma is made and expanded into a mixing zone. The patent is superseding U.S. Pat. No. 805,069 of Dec. 27, 1968 and U.S. Pat. No. 639,880 of May 19, 1967. The applied expansion ratio ranges from 30:1 to 200:1. The lowest energy consumption reported for this process is 2000-3000 BTU/lb of gas treated, which corresponds to from 86 to 130 GJ/tN. The additional energy consumption for air separation and compression seems to give this process unacceptable and unavoidable energy consumption.

U.S. Pat. No. 4,267,027 of May 12, 1981 describes a process for preparation of nitrogen oxides by quenching plasma formed in an unspecified plasma torch. The quench is consisting of catalyst surface cooled by external coils. There are no documented results in the patent.

U.S. Pat. No. 4,705,670 of Dec. 10, 1987 describes a principle for distributing micro-discharges over an electrically conductive liquid, where the formed NO shall be absorbed in the liquid. There are no documented results in the patent.

U.S. Pat. No. 4,877,589 of Oct. 31, 1989 describes a process with an electric arc operating inside a bed of catalyst, the catalyst being various kinds of high temperature resistant materials. The claimed effects are shielding of the ultraviolet light, the creation of turbulence and the distribution of heat. There are no documented results in the patent.

U.S. Pat. No. 4,833,293 of May 23, 1989 describes an electric plasma nitrogen reactor with a sort of path heat transfer principle. The principle consists of a heat capacity pebble principle combined with a pulsating reverse flow principle. There are no documented results in the patent.

The three oldest conceptual patents are the Norwegian patents 12961, 20487 and 19862 from the period of 1903-1909. These patents are from the two companies who contributed to the industrial realization of the electric arc technology. These three patents describe with limited details two independent effects.

NO12961 describes the use of a magnetic field to expand the surface and contact phase between the arc and air and in that way release high amounts of energy into a large volume of air.

NO20487 applies lower pressure to reduce the energy intensity and temperature of the plasma to facilitate contact cooling of the arc itself. The patent is referring to Journal of chemical Soc. 1897, vol 71, page 181 and is stating that the lowering of the pressure alone has no independent effect on the yield.

NO 19862 describes applying lower pressure to reduce the energy intensity and temperature. The yield is described to be higher with higher pressure. The only claim is cooling of the arc and electrode by sending air through the hollow electrodes.

Prior art has further focused on solving the material and temperature challenges, and can be grouped in:
 Applying a magnetic field to move the arc through the air to give large plasma volume with a lower temperature.
 Increasing the pressure to obtain a higher NO yield.
 Lowering the pressure to expand the arc and plasma volume to achieve a lower temperature.
 Quenching with air mixing, water spray or with a gas with solids to create colder plasma.
 Cooling with direct contact in a cooler.

Prior art has not been able to improve the yield and energy efficiency significantly from the first proven technology from 1900-1910. The splitting of the Nitrogen molecule requires high temperature and high energy intensity. The high temperature is a challenge for the materials containing and cooling the arc and plasma.

The challenge has been to design a process where the high temperature arc can split a high fraction of the Nitrogen molecules and where the created plasma can be stabilized and cooled without damaging the containment materials.

The thermodynamic properties of the reactants and reaction products have apparently also been an obstacle for developing the process further.

Applying Gibbs free energy and Arrhenius to find the equilibrium for the reaction I, $$N_2 + O_2 = 2NO, \Delta G_f \text{ for NO} = 86.55 \, kJ/mole \qquad \text{I}$$

shows that at 3500K the equilibrium NO concentration is only 2.0%. The temperature has to be raised to 9000K before the NO concentration will reach 10%. Heating the air to from 2000 to 3000K corresponds to presented energy consumption of 200-360 GJ/tN. This is enough to discourage most chemists from believing that this process can be feasible. This is also why several patents and concepts have been abandoned.

SUMMARY OF THE INVENTION

The disclosed invention is an energy efficient process for making NO from air or air enriched by oxygen. The invention is applying an electric arc which is shaped and controlled by means of a magnetic field. The purpose of the magnetic field is to move the electric arc through the air and plasma at a high speed and longer path, which will give a mix of ionized and dissociated air. Both AC and DC current can be applied. AC will give alternating movements in opposite directions. The process is operating below atmospheric pressure. This is increasing the dissociation in the plasma and reducing the decomposition rate of the formed NO. The process can also apply a direct flow of relatively cold air for quenching the plasma, before contact-cooling the plasma in a counter current heat exchanger. The exchange of heat takes place between feed into and the product going out of the reactor. The process can fix nitrogen from air with an energy consumption of 30 GJ/tonne N or lower, depending on the applied energy recovery principles.

The present process can be carried out by using a reactor comprising an arc and plasma disc section and a heat exchanger section.

DETAILED DESCRIPTION OF THE INVENTION

The present invention relates to a process for producing NO gas from a feed flow of air or oxygen enriched air, by means of moving an electric arc through the air flow by using a magnetic field and AC or DC currents, in a reactor, wherein a pressure lower than 1 bar is applied, wherein the temperature in the exited arc is adjusted to be within the range of 3000 to 5000 Kelvin, and wherein the air flow is quenched by applying a spray of fine water droplets upstream or just downstream the arc, excess air feed or bypassed air to obtain a stable NO-containing plasma having a temperature below 2000 Kelvin.

In an embodiment of the process, the pressure is 0.1-1 bar, preferably 0.2-0.8 bar, more preferably about 0.5 bar.

In a further embodiment of the process, the temperature in the exited arc is adjusted to be within the range of 3500 and 4700 Kelvin.

In a further embodiment of the process, the air flow is quenched by applying a spray of fine water droplets upstream or just downstream the arc, excess air feed or bypassed air to obtain a stable NO-containing plasma having a temperature below 1500 Kelvin.

In a further embodiment of the process, the reactor is an arc and plasma disc reactor.

In a further embodiment of the process, the arc and plasma disc reactor comprises a heat exchanger, to reduce the retention time and to combine cooling of the product gas and preheat of the feed gas.

In a further embodiment of the process, the heat exchanger is a shell and tube heat exchanger.

In a further embodiment of the process, the heat exchanger is a counter current heat exchanger.

In a further embodiment of the process, the retention time is further reduced by using the heat exchanger tube ends as anodes for rotating plasma arc cones with the corresponding cathodes placed opposite to each tube.

In a further embodiment of the process, the retention time is reduced to 0.1 second to achieve 8 volume % NO, preferably less than 0.001 second to achieve 12 volume % NO.

The present process can be carried out by using a reactor comprising an arc and plasma disc section with water spray quenching and a heat exchanger section.

In an embodiment of the reactor, the heat exchanger is a shell and tube heat exchanger.

In a further embodiment of the reactor, the heat exchanger is a counter current heat exchanger.

The reactor can also be described as an arc and plasma disc reactor comprising a heat exchanger.

The present invention is based on a comprehensive study and reverse engineering of the Birkeland Eyde process based on the physical reactor inspection, historical documents and process description displayed at the museum at Notodden in Norway. This gave the inventor a new understanding of the BE process, and a new basis for interpreting the results and mechanisms required to give the actual yield and documented energy consumption. The new understanding and thereof derived models, proved able to simulate the results and observations from the actual process.

The new knowledge of prior art comprises the following combination of energy input to the process for the best performing high load 1 MW reactors:

307 GJ/tN Energy input in the electric arc and magnetic field.

110.0 " Energy lost in water cooling of the electrode, FIG. 3 (12).

6.6" Energy lost to the ambient from the outer surface of the reactor, FIG. 3 (14).

6.4 " Absorbed as chemical energy or enthalpy in the NO formed.

184 " Energy in the product gas leaving the reactor, FIG. 3 (8).

The fact that the reactor outlet temperature is only 975 Kelvin and the measured arc and reactor temperature is in the range of 3200 Kelvin can be explained by the nature of the electric arc reactor. In the reactor only a fraction of the total air going through the reactor is directly heated and exited by the arc. The major part of the air is functioning as a mixing quench reducing the temperature of the air in the arc from 3200K to the mixed plasma of 975K.

BRIEF DESCRIPTION OF THE FIGURES

FIG. 3 shows a process description with flow numbers referring to table 2.

FIG. 4 shows how a counter current shell and tube heat exchanger is preheating the feed air and cooling the product gas from the plasma disc produced as in FIGS. 1 and 2.

FIG. 5 shows how the plasma arcs can be placed at each tube end of the heat exchanger, and how the feed of extra quench air and the cathodes are placed on the opposite side.

FIG. 6 shows how the reactor and heat exchanger is combined in one unit.

EXPLANATIONS FOR THE NUMBERS USED IN FIGURES AND TABLES (1) (1.1) to (1.7) are the electric arcs and gas generated directly by the electric arc.

(2) The magnetic field.

(3) (3.1) & (3.2) are the electrodes.

(4) The magnetic poles.

(5) Feed air.

(6) Feed air going through the electric arc.

(7) Nozzles for jetting the preheated feed air into the arc and plasma zone (1).

(8) Gas mix of air through the arc and extra air or water quench before heat recovery.

(9) Gas outlet.

(10) Heat recovery in the form of steam from the outlet gas (9).

(11) Extra air quench, bypassing the electric arc.

(12) Electrode heat loss from cooling which can be recovered as steam or hot water.

(13) Heat recovery unit for steam production from energy in gas outlet.

(14) Heat loss to ambient.

(15) Reactor.

(16) Heat exchanger.

Definitions:
% is percent by mole.
K is absolute temperature in Kelvin.
° C. is Centigrade according to the Celsius scale.
Bar is bar absolute. 1 bar=100,000 Pascal
GJ is Giga Joule=1,000,000,000 Joule
tN is metric tonnes of Nitrogen.
$\Delta H_f$ is delta heat of formation for the reaction.
$\Delta G_f$ is delta Gibbs free energy for the reaction.
$HNO_3$ is Nitric Acid.

Figure 1:
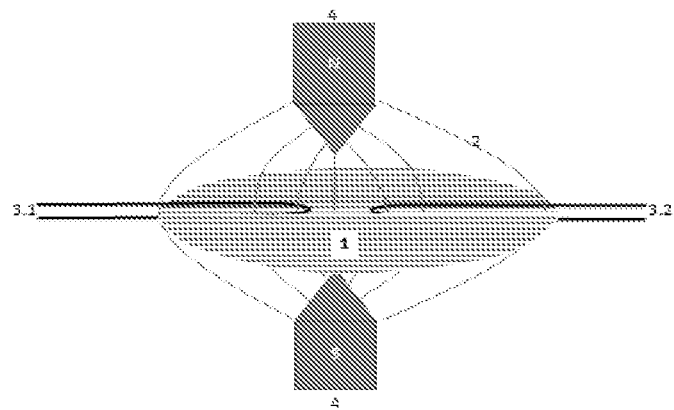
FIGS. 1 and 2 explain how the magnetic field is moving the arc through the plasma and air.

FIG. 1 shows the principle for how the magnetic poles (4) are placed perpendicular to the plasma arc disc (1). The electrodes (3.1) and (3.2) are approaching each other in the center of the horizontal plasma area. The magnetic field (2) is vertical to the plasma disc.

Figure 2:
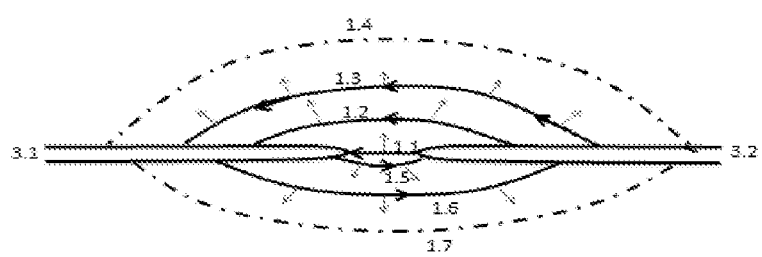

FIG. 2 shows how the arc is starting (1.1) and how it is pulled outwards by the magnetic field (1.2), (1.3) and (1.4), before the electrical potential is getting high enough for a new arc to start (1.5). When the direction of the current has changed, the arc is pulled in the opposite direction (1.6) and (1.7). There is no change in the magnetic field direction. The arc may be moving at the speed of sound from the center to the outer periphery, and can go several times in one direction before the direction of the current is changing.

In order to make a numerical simulation of the process, pseudo equilibrium for the conditions in the arc itself was established.

The equilibrium consists of a combination of the dissociation of the species:

$$N_2 = 2N \qquad \qquad V$$

$$O_2 = 2O \qquad \qquad VI$$

$$NO = O + N \qquad \qquad VII$$

The equilibrium model is a modified Arrhenius with Gibbs free energy from literature. The model was correlated against the known experimental and industrial data.

TABLE 1

Table 1 shows a simulation of the equilibrium conditions in the arc itself, using the pseudo equilibrium at the given temperature and pressure of the arc. The results show the required dissociation in the arc in order to get 1-2% NO in the relatively cold plasma or gas outlet.

| Case reference also Table 2 | Prior Art 1, 2, 3 | Invention 4 | Invention 5 and 6 | Invention 7 | High Pressure Case 8 | High Temp. Case 9 |
|---|---|---|---|---|---|---|
| N2 | 66.0% | 63.97% | 30.83% | 40,.9% | 56.02% | 14.47% |
| O2 | 2.5% | 0.63% | 0.01% | 0.03% | 0.39% | 0.01% |
| N | 0.9% | 1.93% | 41.67% | 30.08% | 11.21% | 61.46% |
| O | 29.3% | 32.70% | 27.30% | 29.12% | 30.88% | 23.88% |
| NO | 1.3% | 0.77% | 0.20% | 0.38% | 1.51% | 0.18% |
| NO + N | 2.2% | 3.70% | 41.87% | 30.46% | 12.72% | 61.64% |
| Bar | 1.0 | 0.2 | 0.2 | 0.5 | 5.0 | 0.2 |
| Kelvin | 3200 | 3200 | 4500 | 4500 | 4500 | 5500 |

The model includes the decomposition of the NO formed as a function of temperature and retention time after the electric arc. The model confirmed prior art and the scientific consensus that higher pressure would give a higher yield of NO, Ref. Table 1 High Pressure case 8 and Table 2 case 8.

With this basis, it was expected that reducing the pressure would give lower yield of NO. To the inventor's surprise, the model gave a higher yield at below atmospheric pressure.

The models confirm that the arc contains higher fractions of N* (reactive nitrogen atoms) and O* (reactive oxygen atoms) than the Gibbs equilibrium based on normal thermodynamics is giving. In a quench by mixing in cold air or by contact cooling, the equilibrium reactions are too slow and are overridden by the statistical probability for recombination to NO versus $N_2$ and $O_2$.

When lowering the pressure this effect is further enhanced. According to Le Chatliers principle the dissociation is higher at lower pressure. In the development of the process and correlating the models for every unit operation, it became obvious that the operation of the process below atmospheric pressure provided significant benefits also to the gross energy consumption.

The reference cases at atmospheric conditions, gave a prohibitive energy consumption of 250-450 GJ/tN. The model and tests showed often less than 2% NO in the outlet gas, which is also confirmed by the operational data. When the NO yield is raised from 2% to 10% the energy consumption per tonne of $N_2$ converted to NO, is reduced by 80%

It is theoretically and practically possible to get higher than 12% of NO in the outlet gas, but 12% is the optimum when the feed is air. The rest of the oxygen is required for the formation of $HNO_3$ as in a normal nitric acid process.

It is also possible to separate nitrogen from oxygen and to vary the concentrations. This is giving limited effect and the energy cost of operating an air-separation, ASU, unit is normally 5-10 GJ/tN, which is more than what is gained through the higher yield.

FIG. 3 is a simplified process flow sheet for the key parameters for the process and the energy efficiency. The feed air (5) is entering the reactor where the arc (1) is moving in the plasma zone. A part of the feed air (6) is ionized, excited and heated to 3000-5000K directly by the electric arc (1). The rest of the feed air (11) is passing through the reactor outside the arc, and is mixed with the heated air (6). The mixed gas (8) is a mix of the exited air (6) and passing air (11). The cooling of the electrodes is a potential energy loss (12) which can be recovered as hot water or steam. The energy recovery (10) from the outlet mixed gas (8) can be done in a steam boiler (13) or by preheating the feed gas. The heat loss to ambient is flow (14). Table 1 refers to the same numbers for the gas flow as in FIG. 3.

To test the overall energy efficiency effects the process as per FIG. 3 was established and simulated. The results of the various cases are described in Table 2.

TABLE 2

Table 2 shows the final outlet NO concentration and energy efficiency of the process as a function of varying the process conditions. The applied retention time from the arc to outlet (T9) is 1 second.

| | | | | | | | Energy input | | | Energy recovery ref. FIG. 3 | | Air | Energy |
| | Process data ref. FIG. 3. | | | | | | | | | | | | |
| | P Bar | Air feed 5 | El. Arc 6 | Air mix 8 | Gas outlet 9 | NO % | Cpr* | Tot Input | Recovery | Ambient 15 | Electrode 12 | outlet 10 | Net consumption |
| | | | Kelvin | | | | | | | GJ/tN | | | |
|---|---|---|---|---|---|---|---|---|---|---|---|---|---|
| 1 | 1.0 | 300 | 3200 | 975 | 975 | 0.8 | 0 | 407 | 0% | 0 | 0 | 0 | 407 |
| 2 | 1.0 | 300 | 3200 | 975 | 300 | 1.6 | 0 | 307 | 100% | 7 | 110 | 184 | 6.4 |
| 3 | 1.0 | 300 | 3200 | 975 | 575 | 1.6 | 0 | 307 | 75% | 5 | 82 | 104 | 116 |
| 4 | 0.2 | 300 | 3500 | 975 | 575 | 2.2 | 15 | 127 | 75% | 2 | 29 | 22 | 74 |
| 5 | 0.2 | 300 | 4500 | 975 | 575 | 7.5 | 4 | 47 | 75% | 1 | 12 | 8 | 26 |
| 6 | 0.2 | 300 | 4500 | 975 | 375 | 7.7 | 4 | 46 | 75% | 1 | 12 | 13 | 21 |
| 7 | 0.5 | 300 | 4500 | 975 | 375 | 6.6 | 2 | 49 | 75% | 1 | 12 | 13 | 23 |
| 8 | 5.0 | 300 | 4500 | 975 | 375 | 3.5 | 10 | 97 | 75% | 2 | 27 | 28 | 40 |
| 9 | 0.2 | 300 | 5500 | 975 | 375 | 7.3 | 4 | 96 | 75% | 2 | 35 | 20 | 39 |

*Pressure/compression energy is not recovered.

Explanation of Columns in Table 1:

P is the operating pressure for the reactor.

5, 6, 8 and 9 are giving the process temperature referring to the process flows in FIG. 3.

NO is how much NO is analyzed in the gas outlet

Recovery % is how much of the extracted energy is recovered as value, or how much the loss is reduced. The efficiency is not applied for compression energy.

Cpr=compression energy is calculated with 80% adiabatic efficiency and 25% recovery of energy in expander or suction turbine, otherwise no recovery.

Ambient loss is the heat loss from surface of reactor and connected piping. Reduction of loss is better insulation vs. original design Electrode loss is from cooling the electrode. This loss can be reduced by using the steam produced and or finding a better electrode material or by designing the anode as being cooled by the incoming air.

Air outlet loss is energy in the gas after the quench. This can be recovered in a boiler as was done in the original design, but not credited to the process.

Explanation of the Row Numbers in Table 1 Showing the Result of the Different Simulations:

1 Prior art, reference case as per full scale production reports with parameters. 0% heat recovery means no credit for the steam production from gas. Note also that (9) is 975 K which means no heat recovery from the gas outlet, and the decomposition of NO is high giving only 0.8% NO in the gas outlet 2 Prior art, reference case with 100% energy recovery to verify the heat balance. The outlet temperature (9) is reduced to 300K recovering all energy. 6.4 GJ/tN is $dH_f$ for NO formation from $N_2$ and $O_2$. The NO yield is improved to 1.6% due to the cooling. This is also the reason for the lower energy consumption compared to the previous case.

3 Prior art, reference case with 75% heat recovery. Significant improvement, but still far away from being competitive. Main reason is low NO yield.

4 The invention, applying a pressure to 0.2 bar. This gives more $N_2$ dissociation ref Table 1. The higher final yield 2.2% NO, reduce the specific effect of the losses.

The invention, applying 4500K arc temperature at 0.2 bar pressure. This gives even more $N_2$ dissociation ref Table 1, and significantly better energy efficiency as the final NO yield is increased to 7.5%

6 The invention, demonstrates the effect of cooling to a lower final temperature. This is mainly an energy recovery effect, but the yield is also improved through the improved cooling.

7 The invention, same as 6, but with the effect of increasing the pressure to 0.5 bar. The lower yield is resulting in a lower specific compression energy. The lower dissociation ref Table 1, is increasing the specific energy consumption.

8 A cased study of consensus knowledge of operating at 5 bar. The effect is positive but 5 bar pressure is less favourable 0.2 bar=0.8 bar under pressure.

9 A case study of increasing the temperature to 5500 K. The final process yield is not increasing even if the dissociation is higher, ref. Table 1. The thermal decomposition of NO is too high and the extra energy input gives higher specific energy consumption.

The simulations further show that with a retention time less than 0.001 second, 12% NO in air can be reached with an energy consumption of 21 GJ/tN. These following conditions are realistic for normal high temperature alloy materials and for small scale reactors:

| | | |
|---|---|---|
| Arc temperature | 4600 K | Adjusted by power input and preheating. |
| Pressure | 0.2 bar | Normal operating pressure for electric arc. |
| Temperature 8 | 1200 K | Normal for high temperature materials. |

The equipment required to design and operate such a process can be established by applying known unit operational principles, while securing a geometrical design meeting the simulated turbulence and retention time. The dimensions of the full scale process running at Notodden and Rjukan in Norway were by far optimized, but the 2 MW power per reactor unit of 1 meter diameter confirms that the process is industrially feasible.

The present invention provides a process in which the feed air flows perpendicular into and out of the electric arc plasma disc. This is shortening the retention time and increasing the mixing and turbulence significantly from prior art.

FIG. 4 shows a principle for how the gases can be preheated and cooled in a counter current heat exchanger (16). The heat exchange secure lower energy requirement to reach the optimum plasma conditions. Feed air flow (5) goes through the heat-exchanger (16) tubes. The tubes are equipped with heat resistant nozzles (7) for pressure drop and jet feeding the air to the reactor (15) where the electric arc (1) is heating the air going through it. The gas leaving the plasma arc (8) is quenched with a spray of water coming from the nozzle cooling water (11.2) and or mixed with the air feed (11.1) which is not going through the electric arc (1). The gas outlet (9) on the shell side of the heat exchanger (16) is cooled by the air feed (5) on the tube side. The magnetic field is running parallel with the length of the tubes.

FIG. 5 shows a principle for further improvement by using rotating conical electric plasma arcs (1) on each tube. The tubes are the anodes (3.1) and the cathodes (3.2) are placed opposite the tube-end anodes. In this case the current can be DC. Air feed (5) is entering through the heat exchanger (16) tubes and product gas (9) is leaving the heat exchanger (16) shell side. The optional quenching gas which optionally can containing a fine water droplet spray (11) is entering from the cathode side and is mixed with the plasma arc (1) to form colder stable plasma (8), which is further cooled in the heat exchanger (16) shell side to become the product gas (9). The electric arc (1) is rotating in the plasma. The magnetic field is running parallel with the length of the tubes. In this case anode cooling will not be required, and the tube can preferably be made of copper.

FIG. 6 shows how the reactor and heat exchanger are combined in one unit. In the heat exchanger the feed air (5) is preheated and the outlet gas (9) is cooled. The reactor (15) contains the electric arc (1) and the mixed plasma zone (8). The air is entering (5) through the tube side of the heat exchanger (16) before being jetted into the reactor through nozzles (7). In the reactor (15) the air is mixed and heated by the arc (1) before the mix is leaving through the shell side of the heat exchanger (16) to the outlet (9).

The invention claimed is:

1. A process for producing NO gas from a feed flow of air or oxygen enriched air, comprising moving an electric arc through the air flow by using a magnetic field and AC or DC currents in an arc and plasma disc reactor,
   wherein a pressure lower than 1 bar is applied in the reactor,
   wherein the temperature in the arc is adjusted to be within the range of 3000 to 5000 Kelvin,
   wherein the air flow is quenched by applying a spray of fine water droplets upstream or just downstream of the arc, excess air feed or bypassed air to obtain a stable NO-containing plasma having a temperature below 2000 Kelvin,
   wherein the arc and plasma disc reactor comprises a shell and tube heat exchanger, and
   wherein the heat exchanger tube ends are used as anodes for rotating plasma arc cones with corresponding cathodes placed opposite to each tube.

2. The process according to claim 1, wherein the pressure is 0.2-0.8 bar.

3. The process according to claim 1, wherein the temperature in the arc is adjusted to be within the range of 3500 and 4700 Kelvin.

4. The process according to claim 1, wherein the air flow is quenched by applying a spray of fine water droplets upstream or just downstream of the arc, excess air feed or bypassed air to obtain a stable NO-containing plasma having a temperature below 1500 Kelvin.

5. The process according to claim 1, wherein the heat exchanger is a counter current heat exchanger.

6. The process according to claim 1, wherein retention time is reduced to 0.1 second to achieve 8 volume % NO.

7. The process according to claim 2, wherein the temperature in the arc is adjusted to be within the range of 3500 and 4700 Kelvin.

8. The process according to claim 2, wherein the air flow is quenched by applying a spray of fine water droplets upstream or just downstream of the arc, excess air feed or bypassed air to obtain a stable NO-containing plasma having a temperature below 1500 Kelvin.

9. The process according to claim 3, wherein the air flow is quenched by applying a spray of fine water droplets upstream or just downstream of the arc, excess air feed or bypassed air to obtain a stable NO-containing plasma having a temperature below 1500 Kelvin.

10. The process according to claim 7, wherein the air flow is quenched by applying a spray of fine water droplets upstream or just downstream of the arc, excess air feed or bypassed air to obtain a stable NO-containing plasma having a temperature below 1500 Kelvin.

* * * * *